(12) United States Patent
Robertsson et al.

(10) Patent No.: US 7,328,108 B2
(45) Date of Patent: Feb. 5, 2008

(54) PROCESSING SEISMIC DATA

(75) Inventors: Johan Olof Anders Robertsson, Oslo (NO); Aslaug Strommen Melboe, Oslo (NO); Dirk-Jan Van Manen, Oslo (NO); Remco Muijs, Geldermalsen (NL)

(73) Assignee: WesternGeco, L.L.C., Houston, TX (US)

( * ) Notice: Subject to any disclaimer, the term of this patent is extended or adjusted under 35 U.S.C. 154(b) by 30 days.

(21) Appl. No.: 10/531,000

(22) PCT Filed: Sep. 24, 2003

(86) PCT No.: PCT/GB03/04190

§ 371 (c)(1),
(2), (4) Date: Jul. 12, 2006

(87) PCT Pub. No.: WO2004/029662

PCT Pub. Date: Apr. 8, 2004

(65) Prior Publication Data

US 2006/0253256 A1    Nov. 9, 2006

(30) Foreign Application Priority Data

Sep. 27, 2002    (GB) ................................ 0222524.1

(51) Int. Cl.
*G01V 1/28* (2006.01)

(52) U.S. Cl. ........................................................ 702/17

(58) Field of Classification Search ............... 702/14, 702/17; 367/73
See application file for complete search history.

(56) References Cited

U.S. PATENT DOCUMENTS

| 5,774,416 A | 6/1998 | Sadek | ......................... 367/24 |
| 2002/0118602 A1 | 8/2002 | Stoffa et al. | ................ 367/151 |

OTHER PUBLICATIONS

International Search Report PCT/GB03/04190 dated Jan. 30, 2004.
Schalkwijk, et al : "Application of Two-Step Decomposition to Multicomponent Ocean-Bottom Data: Theory and Case Study" Journal of Seismic Exploration, Geophysical Press, Castelnau-LE-NEZ, GB, vol. 8, No. 8, 1999, pp. 261-278.

*Primary Examiner*—Donald E McElheny, Jr.
(74) *Attorney, Agent, or Firm*—Jeffrey A. Pyle; Liangang (Mark) Ye; Jeffrey E. Griffin

(57) ABSTRACT

A method of processing multi-component seismic data acquired at a receiver station comprises determining a calibration filter that calibrate a first component of the seismic data relative to a second component of the seismic data in order to compensate for differences in coupling between the two components. The determination of the calibration filter comprises processing the data in the common shot domain. This allows optimisation criteria to be applied to the up- and down-going constituents of particle velocity, and this is simpler than prior art methods of applying optimisation criteria to the up-going and down-going constituents of the pressure.

30 Claims, 4 Drawing Sheets

PROCESSING SEISMIC DATA

BACKGROUND OF THE INVENTION

1. Field of the Invention

The present invention relates to a method of processing multi-component seismic data. It particularly relates to a method of processing seismic data to determine a calibration filter that calibrates one component of the seismic data relative to another component of the seismic data The invention further relates to an apparatus for processing seismic data.

2. Description of the Related Art

FIG. 1 is a schematic view of a seismic surveying arrangement. In this figure the surveying arrangement is a marine surveying arrangement in which seismic energy is emitted by a seismic source 1 that is suspended within a water column 2 from a towing vessel 3. In this example the water column is the sea, but the methods described hereinbelow can be applied to data acquired in seawater or in freshwater. When the seismic source 1 is actuated seismic energy is emitted downwards and is detected by an array of seismic receivers 4 disposed on the seafloor 5. (As used herein the term "seabed" denotes the earth's interior, and the term "seafloor" denotes the surface of the seabed.)

Many seismic surveys now use multi-component receivers that record two or more components of the seismic energy incident on the receiver. For example a 3-component (3-C) seismic receiver contains three orthogonal geophones and so can record the x-, y- and z-components of the particle motion at the receiver (the particle motion may be the particle displacement, particle velocity or particle acceleration or even, in principle, a higher derivative of the particle displacement). In a marine seismic survey a 4-component (4-C) seismic receiver can alternatively be used. A 4-C receiver contains a (dynamic) pressure sensor such as a hydrophone in addition to three orthogonal geophones and so can record pressure fluctuations as acoustic waves propagate in the water column (a scalar quantity) in addition to the x-, y- and z-components of the particle motion of the seabed.

Many different paths exist by which seismic energy may travel from the source 1 to a receiver 4 in the seismic surveying arrangement of FIG. 1. A number of paths are indicated schematically in FIG. 1.

The path 6 shown in FIG. 1 is known as the "direct path". Seismic energy that travels along the direct path 6 travels from the source 1 to a receiver 4 essentially in a straight line without undergoing reflection at any interface.

Path 7 in FIG. 1 is an example of a "water layer multiple path". Seismic energy that follows a water layer multiple path propagates wholly within the water column 2, but undergoes one or more reflections at the surface of the water column and/or the seafloor 5 so that the seismic energy passes through the water column more than once. The water layer multiple path 7 shown in FIG. 1 involves one reflection at the seafloor 5 and one reflection at the surface of the water column, but many other water layer multiple paths exist.

The path 8 in FIG. 1 is an example of a "critical refraction path". Seismic energy that follows the path 8 propagates downwards to the seafloor 5, and penetrates into the earth's interior 10 (ie into the seabed). The seismic energy continues propagating downwardly, until it reaches a boundary 11 between two layers of the earth that have different acoustic impedance. The seismic energy undergoes critical refraction, propagates along the boundary 11, before eventually being refracted upwards towards the receiver 4. Critical refraction may also occur at the water-seabed interface, and downwardly propagating seismic energy that is refracted in this way will propagate along the water-seabed interface and will then propagate upwardly into the water column.

The path 9 shown in FIG. 1 is known as a "primary reflection path". Seismic energy that follows the primary reflection path 9 propagates downwards through the water column, is refracted at the seafloor 5, and propagates downwardly through the earth's interior. The seismic energy is refracted at the boundary 11, but is not critically refracted and so continues to propagate downwardly into the earth. It eventually undergoes reflection at a geological structure 12 that acts as a partial reflector of seismic energy, and the reflected seismic energy is, after further refraction as it passes upwardly through the boundary 11, incident on the receiver 4. The general intent of a seismic survey is to make use of the seismic energy that follows the primary reflection path in order to obtain information about the interior structure of the earth.

Seismic energy acquired at a receiver may contain upwardly and/or downwardly propagating seismic energy depending on the location of the receiver and on the event. For example seismic energy that travels along the critical refraction path 8 shown in FIG. 1 will, when it is incident (travelling upwardly) on the water-seabed interface, be partly transmitted into the water column and partially reflected back into the seabed 10. Thus, a critical refraction event will consist purely of upwardly propagating seismic energy above the seafloor 5, but will contain both upwardly and downwardly propagating seismic energy below the seafloor 5. As another example, seismic energy that travels along the direct path 6 shown in FIG. 1 will, when incident on the water-seabed interface 5, be partially transmitted into the seabed and partially reflected back into the water column. Hence, the direct event will contain both upwardly and downwardly propagating seismic energy above the seafloor, but will contain only downwardly propagating seismic energy below the seafloor. It is therefore often of interest to decompose the seismic data acquired at the receiver 4 into an up-going constituent and a down-going constituent, above or below the seafloor 5. For example, in a 4-C seismic survey it may be of interest to decompose the pressure and the vertical particle velocity recorded at the receiver into their up-going and down-going constituents above the seafloor.

Various filters that enable decomposition of seismic data into up-going and down-going constituents have been proposed. For example, K. M. Schalkwijk et al have suggested, in "Application of Two-Step Decomposition to Multi-Component Ocean-Bottom Data: Theory and Case Study", J. Seism. Expl. Vol. 8 pp261-278 (1999), that the down-going and up-going constituents of the pressure just above the seafloor may be expressed as:

$$P^-(f,k) = \frac{1}{2}P(f,k) - \frac{\rho}{2q(f,k)}v_z(f,k),$$
$$P^+(f,k) = \frac{1}{2}P(f,k) + \frac{\rho}{2q(f,k)}v_z(f,k),$$
(1)

where P is the pressure acquired at the receiver, $P^-$ is the up-going constituent of the pressure above the seafloor, $P^+$ is the down-going constituent of the pressure above the seafloor, f is the frequency, k is the horizontal wavenumber, $v_z$ is the vertical particle velocity component acquired at the receiver, ρ is the density of the water, and q is the vertical slowness in the water layer.

As can be seen, the expressions in equation (1) require two of the components of seismic data recorded at the receiver to be combined. These filters are an example where it is necessary to combine two components of the acquired seismic data. It may also be necessary to combine two or more components of the acquired seismic data in order to decompose the acquired seismic data into p-wave and s-wave (pressure-wave and shear-wave) components, or to remove water level multiple events from the seismic data.

One problem in combining different components of the seismic data acquired at a receiver is that the different components of the seismic data may not be correctly calibrated against one another. This is particularly the case where the two components that are being combined are, as in equation (1), the pressure and the vertical particle velocity. There are usually differences in coupling or impulse response between the hydrophone used to acquire the pressure and the geophone used to acquire the vertical particle velocity. It is necessary to calibrate the data for these differences before the pressure and vertical particle velocity can be combined, and this process is known as "P/$v_z$ calibration". This calibration process involves developing a calibration filter that compensates for the differences in coupling and impulse response between the hydrophone and the vertical geophone and then applying the filter to one data set to compensate for the differences in coupling.

Schalkwijk et al, and others, have suggested that the P/$v_z$ calibration problem can be addressed by assuming that one component of the seismic data has been correctly recorded, and calibrating the other component of the seismic data against the component that is assumed to be correctly recorded. In general, it is assumed that the hydrophone is well coupled to the seismic wavefield, so that the pressure recording is taken to be correct. The vertical component of the particle velocity is then calibrated against the pressure to compensate for coupling and impulse response differences between the hydrophone and the vertical geophone. Schalkwijk et al therefore proposed that equation (1) above should be modified by applying a calibration filter to the vertical particle velocity. They proposed that the equation given above for the down-going constituent of the pressure above the seafloor should be modified to read as follows:

$$P^+(f,k) = \frac{1}{2}P(f,k) + a(f)\frac{\rho}{2q(f,k)}v_z(f,k). \quad (2)$$

In equation (2) a(f) represents a frequency-dependent calibration filter. The remaining terms in equation (2) have the same meaning as in equation (1).

The method proposed by Schalkwijk et al. for determining the calibration filter a(f) is to find the calibration filter that minimises the energy of the down-going pressure constituent above the seafloor for a portion of the seismic data that contains only primary reflections. Seismic energy travelling along a primary reflection path is propagating upwardly just above the seafloor at the receiver position, so that the down-going constituent of the pressure just above the seafloor should be zero for a primary reflections. Schalkwijk et al. used a least squares method to find the calibration filter that minimises the energy of the down-going constituent of the pressure in a window containing only primary reflection events. Once the calibration filter a(f) has been determined in this way, it is applied to the entire data set to calibrate the vertical particle velocity.

The existence of various paths of seismic energy from the source to the receiver means that the data acquired at the receiver in a real seismic survey will contain events corresponding to more than one possible path. These events will occur at different times after the actuation of the seismic source 1, as different paths of seismic energy have different associated travel times. In order to apply the method of Schalkwijk et al. to determine the calibration filter, data in a time window that contains only a primary reflection event must be selected.

The method proposed by Schalkwijk et al. has the disadvantage that the time window containing only primary reflection events has to be picked manually. The primary reflection events are not the first events acquired at the receiver following actuation of the source, and so cannot be picked automatically. A further disadvantage is that in some cases, for example if the seismic source has a long signature, it may be hard to distinguish between the direct arrival and the primary reflection events, so that it may be difficult to isolate the correct events. Moreover, in shallow water the water layer multiple events may arrive shortly after the direct wave. In this case, the derivation of a(f) is based on a very limited amount of data, reducing the accuracy of the results. The direct event and water multiple events contain downwardly propagating seismic energy so that use of a time window that inadvertently included the direct event or water multiple events would not give correct results for the calibration filter.

Co-pending UK Patent application No. 0200560.1 and PCT application PCT/GB 03/00052 propose applying the approach of Schalkwijk et al to a time window containing critically refracted waves, which also contain only up-going energy above the seafloor. This technique is more suitable for automation using first-break pickers, and allows the method to be applied to data acquired in shallow waters.

Ball, V. L. and Corrigan, D. suggest, in "Dual sensor summation of noisy ocean-bottom data", 66th Ann. Internat. Mtg: Soc. of Expl. Geophys., 28-31 (1996), calibrating the vertical geophone data against pressure by applying a hydrophone ghost operator to $v_z$ and a geophone ghost operator to the pressure. It can be shown that this approach is equivalent to predicting the down-going pressure reflected from the sea surface from the computed up-going pressure. Minimising the difference between the predicted and the computed down-going pressure reflected from the sea surface at times larger than source duration plus the one-way propagation time through the water layer then allows the desired calibration filter to be determined. A significant drawback of this technique is the need for accurate information about the depth of the water column in the survey area.

Another approach to calibrating data for differences before the pressure and vertical particle velocity is to require seismic energy to be preserved during propagation through the water layer. In this case, frequency- and wavenumber-dependent calibration operators are designed by means of spectral balancing of the up- and down-going wave constituents just above the seafloor.

SUMMARY OF THE INVENTION

The present invention provides a method of processing multi-component seismic data acquired at a receiver station from seismic signals propagating in a medium, the method comprising the steps of: selecting a first portion of the seismic data; and determining a calibration filter from the first portion of the seismic data, the calibration filter being to calibrate a first component of the seismic data relative to a second component of the seismic data; wherein the step of determining the calibration filter comprises processing the data in the common shot domain.

The term "receiver station" may denote, for example, a single receiver (for example in single sensor seismic acquisition), a hard-wired group of receivers, etc.

Coupling and instrument response variations for a particular seismic receiver or receiver station are receiver-consistent effects—that is, once a multi-component receiver has been deployed the required calibration operator for the receiver is constant and does not depend on the source position. Receiver calibration has therefore hitherto been performed in the common-receiver domain (CRD). When seismic data is processed in the common-receiver domain, all data acquired at one receiver is sorted into a "gather" for that receiver—and since all data in the receiver gather was acquired at a single receiver, a single calibration operator can be used to correct all the data in the gather for coupling and instrument response variations.

The inventors have realised, however, that optimising the vector fidelity of multi-component receivers in the common shot domain (CSD) has considerable advantages, including:

unlike CRD processing, processing in the CSD does not implicitly assume the sub-surface to be laterally invariant;

rough sea perturbations can properly be accounted for;

it is possible to benefit from the dense receiver spacing if the source-side spacing is coarser; and waterborne noise that is not shot-generated can be removed more efficiently.

It is conventional to perform the calibration technique in the common-receiver domain since this allows the calibration filter for each receiver to be determined separately, but this has the disadvantage that rough sea perturbations cannot be properly accounted for, and that background noise cannot be removed efficiently. Furthermore, applying the processing in the common receiver domain implicitly assumes that the earth's sub-surface is laterally invariant.

The calibration filter may then applied to seismic data recorded at the specific receiver or receiver station which acquired the seismic data used to determine the calibration filter. Applying the calibration filter compensates for the effects of the different coupling for the first and second components of the seismic data.

The calibration filter is receiver-specific, so a separate calibration filter is preferably determined for each receiver (or receiver station) in a seismic survey.

A second aspect of the invention provides a method of seismic surveying comprising the steps of: actuating a source of seismic energy; acquiring seismic data at a receiver station spatially separated from the source; and processing the data by a method as defined in the first aspect of the invention.

A third aspect of the invention provides an apparatus for processing multi-component seismic data acquired at a receiver station from seismic signals propagating in a medium, the apparatus comprising: means for determining a calibration filter from a first portion of the seismic data, the calibration filter being to calibrate a first component of the seismic data relative to a second component of the seismic data; wherein the apparatus is adapted to determine the calibration filter by processing the seismic data in the common shot domain.

The apparatus may comprise a programmable data processor.

A fourth aspect of the invention provides a storage medium containing a program for controlling a programmable data processor to carry out a method as defined in the first or second aspect.

A fifth aspect of the invention provides a program for controlling a computer to carry out a method as defined in the first or second aspect.

Preferred features of the invention are set out in the dependent claims.

Preferred embodiments of the present invention will now be described by way of illustrative example with reference to the accompanying figures in which:

DETAILED DESCRIPTION OF THE INVENTION

As outlined above, existing $P/v_z$ calibration techniques are based on finding calibration filters that minimise the up-going or down-going constituent of pressure in a water column (as defined by equation (2)). The term $1/q(f,k)$ in equation (2) may be considered as a spatial filter, and the prior methods have the disadvantage that they require computing the term $1/q(f,k) [a(f) v_z(f,k)]$. As the calibration filters are a function of position, spatial filter operations on the term $[a(f) vz(f,k)]$ complicate the computation of the calibration filters $a(f)$ for each individual receiver position.

The present invention overcomes these disadvantages by performing the spatial filter operation in the common shot domain. This allows the optimisation criteria to be applied to the up- and down-going components of particle velocity, thus avoiding spatial filter operations on the term $[a(f) vz(f,k)]$.

The invention makes use of the fact that the up- and down-going constituents of the vertical component of particle velocity in the water layer can be expressed as $$v_z^\pm(f,k) = \frac{1}{2}a(f)v_z(f,k) \pm \frac{q(f,k)}{2\rho}P(f,k) \quad (3)$$

In equation (3), $a(f)$ again denotes the frequency-dependent calibration filter that corrects for imperfections in the recording of $v_z$, $v_z^-$ denotes the up-going constituent of the vertical component of particle velocity, and $v_z^+$ denotes the down-going constituent of the vertical component of particle velocity just above the seafloor. The remaining quantities in equation (3) have the same meaning as in equation (2).

The determination of the up- and down-going constituents of the vertical component of the particle velocity involves applying the spatial filter $q(f,k)$ to the pressure, rather than to the calibrated vertical particle velocity. As a result, the filter operation does not interact with the unknown calibration filter $a(f)$ when applied in equation (3) in the common shot domain. Determining the calibration filter in the common shot domain—or performing at least some of the steps of the determination of the calibration filter in the common shot domain—allows the calibration filters to be determined from the up- and down-going components of the particle velocity according to equation (3), therefore greatly simplifying the processing.

A further advantage of using equation (3) is that the filter operator $1/q(f,k)$ used in equation (2) contains a pole. In contrast, the filter operator $q(f,k)$ in equation (3) does not contain a pole, and simply contains a zero. As a result, techniques based on equation (3) are numerically more stable, and facilitate the use of spatially compact filter approximations. The use of spatially compact filter approximations is advantageous when processing data acquired at a survey location where there are significant lateral variations in the earth's surface parameters.

Figure 2:
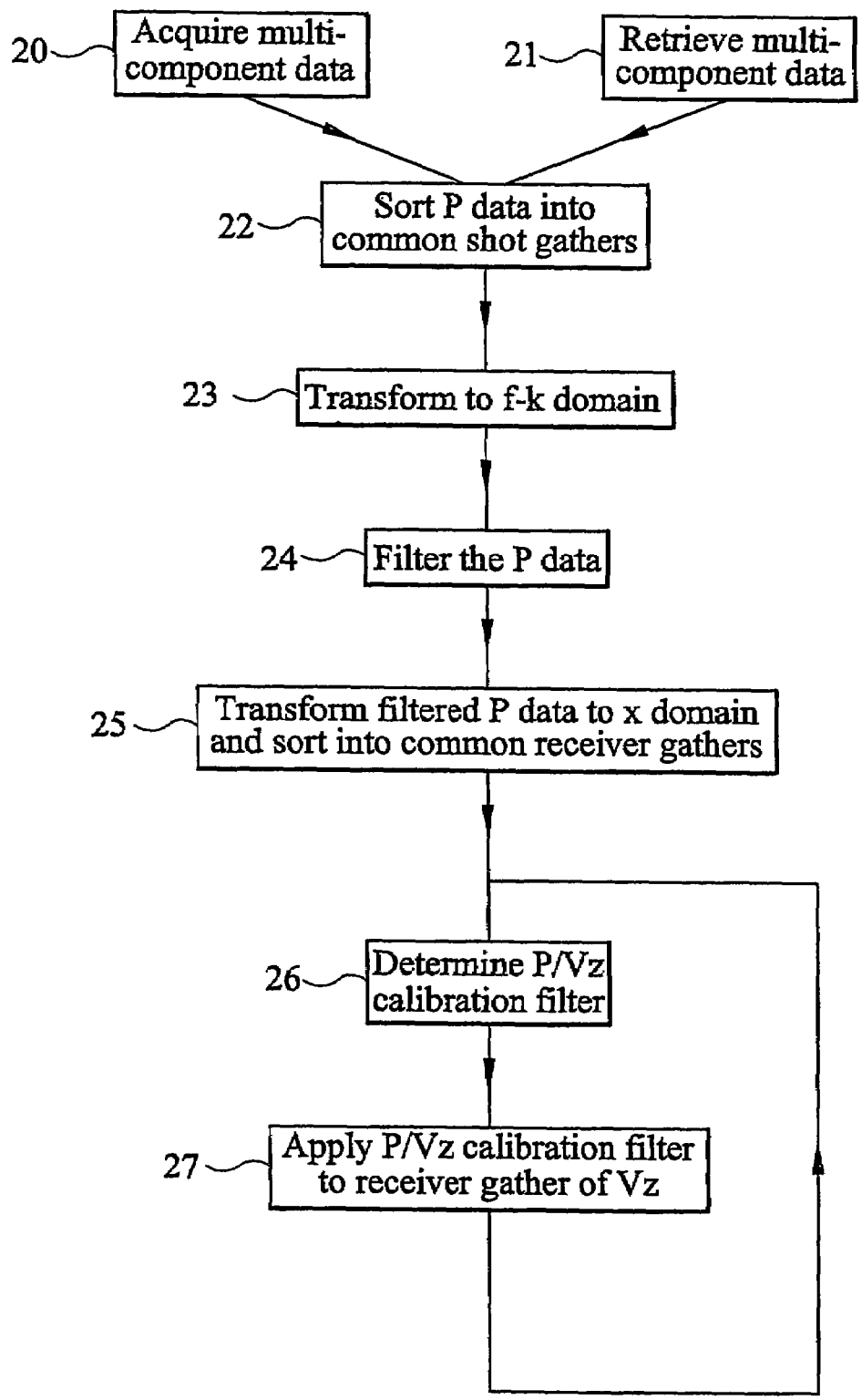
FIG. 2 is a block flow diagram of a method according to one embodiment of the present invention.

FIG. 2 illustrates one method of determining a calibration filter in the common shot domain. This example is described with reference to $P/v_z$ calibration, but a similar procedure may also be carried out for $P/v_x$ calibration as suggested by Schalkwijk et al. (above), provided that the elastic properties of the seabed are known.

The method shown in FIG. 2 is based on the $P/v_z$ calibration techniques proposed by Schalkwijk et al (above) and in UK patent application No. 0200560.1. In the method of FIG. 2, the frequency-dependent calibration filter is determined by minimising the energy of the down-going constituent of the vertical component of the particle velocity $v_z^-$ over a data window that contains only up-going events. For example, the data window may contain only the primary reflection event (as proposed by Schalkwijk et al.) or it may contain only critically refracted events (as proposed in UK patent application No. 0200560.1).

Initially, multi-component seismic data are acquired at step 20. In this embodiment the multi-component seismic data contain at least pressure recordings and vertical particle velocity recordings.

The invention may alternatively be applied to pre-existing seismic data. In this case, step 20 is replaced by the step, step 21, of retrieving multi-component seismic data containing at least pressure recordings and vertical particle velocity recordings from storage.

Figure 1:
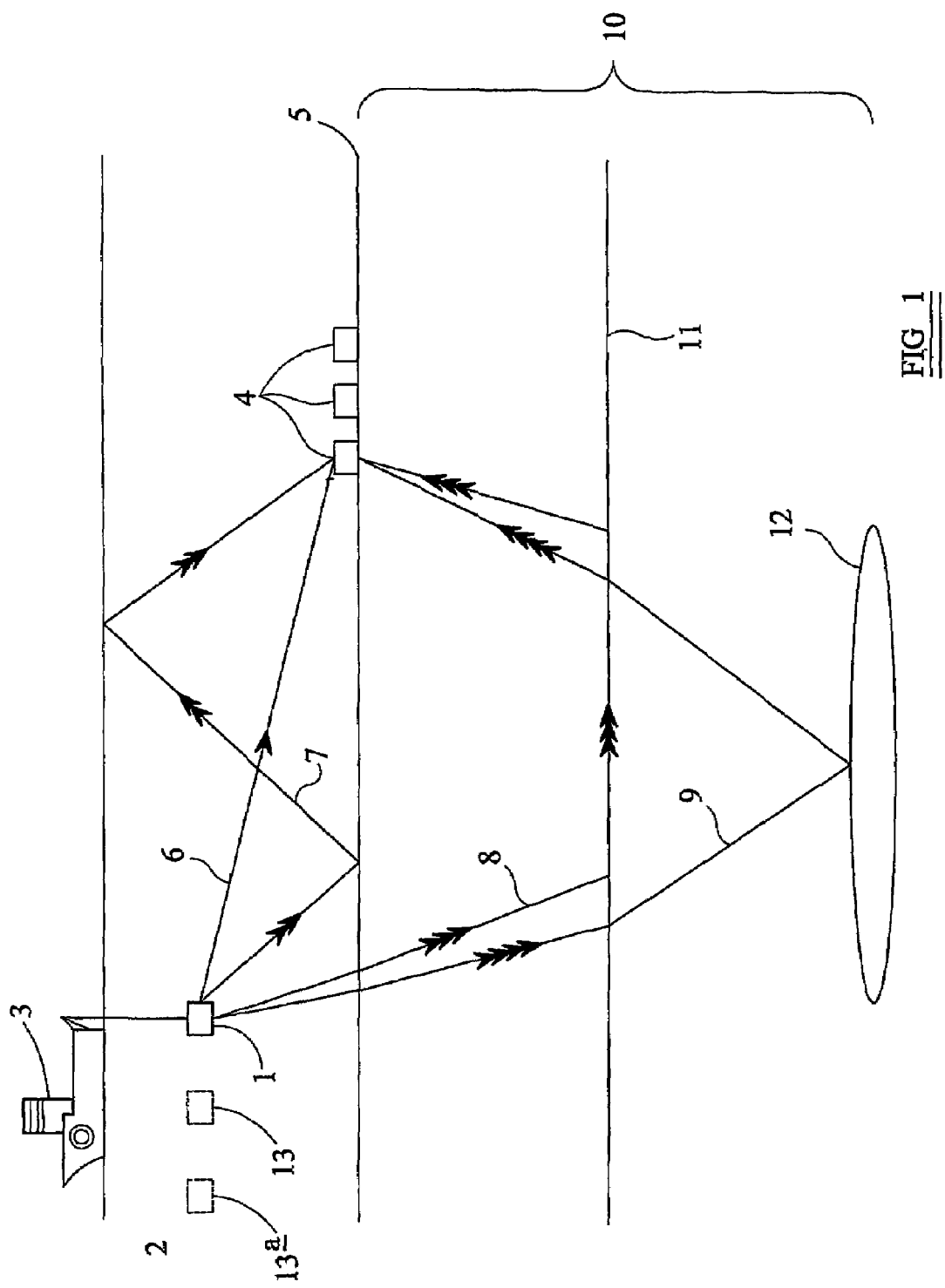
FIG. 1 is a schematic illustration of a seismic survey.

Next, at step 22, the pressure data is sorted into common shot gathers. Each gather will contain all pressure data recorded for a particular shot—so where data is acquired using the seismic surveying arrangement shown in FIG. 1, for example, one gather will contain pressure data recorded when the source 1 is actuated at one location indicated schematically by 13 in FIG. 1, another gather will contain all pressure data recorded when the source is at another location indicated schematically by 13a and so on. Each gather will contain pressure data acquired at all receivers 4 in the seismic surveying arrangement. The pressure data acquired by a receiver will typically be in the form of a record of the pressure at a receiver measured as a function of time since the actuation of the seismic source 1. That is, each receiver records P(receiver position, t) which, if the sources and receivers are arranged along a straight line, may be simplified to $P(x,t)$.

Next, at step 23, the pressure data are transformed, in this embodiment into the frequency-wave number (f-k) domain to give $P(f,k)$. The transform to the frequency-wave number domain may be carried out using any suitable technique. The invention is not, however limited to the f-k domain and the method of the invention may be used in other domains such as, for example, the x-t domain, the x-f domain, the k-t domain, the k-f domain, the tau-p domain, etc.

Next, at step 24, the pressure data are spatially filtered. That is, the filter $q(f,k)$ is applied to the pressure data to yield the filtered pressure data $q(f,k)P(f,k)$. The filter $q(f,k)$ is obtained from the seismic data acquired at step 20 or retrieved at step 21, and this can be done using any known technique. The determination of the filtered pressure data may also be calculated using any known technique. This spatial filtering step is carried out on each pressure recording in a shot gather, and this process is then repeated for all shot gathers.

At step 25, the filtered pressure recordings are transformed back to the x-domain, for example the f-x, τ-x or t-x domain. The filtered pressure recordings are then sorted into receiver gathers. Each receiver gather contains (filtered) pressured recordings acquired at only one receiver or receiver station.

At step 26, a frequency dependent calibration filter $a(f)$ is determined for one receiver gather from a portion of the seismic data in that gather. In this embodiment the calibration filter is determined using equation (3), by finding the calibration filter that minimises the up-going or down-going constituent of the vertical particle velocity for a time window in which that constituent is expected to be zero. (Although equation (3) is written in the f-k domain, a corresponding equation exists in the x-domain.) For example, the time window selected may be a time window that is expected to contain only up-going seismic energy just above the sea floor, such as a time window that contains only the primary reflection events or a time window that contains only critically refracted events. Where a time window that is expected to contain only up-going seismic energy is selected, the calibration filter is determined by finding the filter that minimises the down-going constituent of the vertical particle velocity in the selected time window.

The result of step 26 is a calibration filter for the particular receiver (or receiver station) used to acquire the pressure data in the receiver gather on which step 26 was performed. This calibration filter may then be used to calibrate vertical velocity component data acquired at that receiver (or receiver station), at step 27. The calibration filter determined for a receiver (or receiver station) may be applied to vertical velocity component data outside the time window used to determine the calibration filter, and it may be used to calibrate vertical velocity component data which was acquired at that receiver (or receiver station) but which was not used in the determination of the calibration filter.

Steps 26 and 27 may then be repeated for other receiver gathers, to determine calibration filters for each receiver (or receiver station) in the seismic surveying arrangement.

The calibrated vertical velocity data may be subjected to further processing steps (not shown).

In the embodiment of FIG. 2, step 22 comprises transforming the pressure data to the f-k domain. It would alternatively be possible for step 22 to comprise transforming the pressure data to the τ-p domain, in which case step 23 would comprise filtering the pressure data in the τ-p domain.

Figure 3:
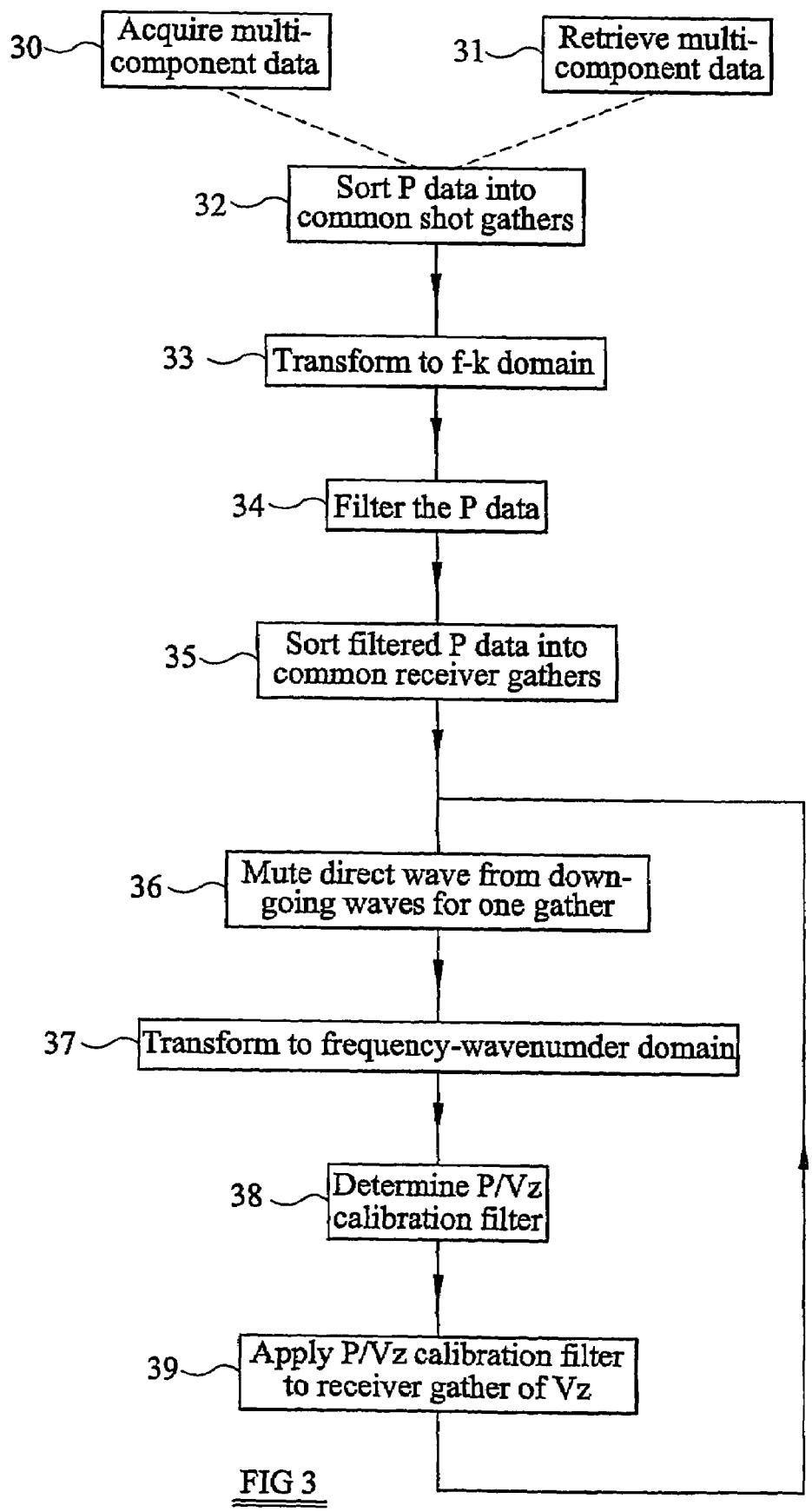
FIG. 3 is a block flow diagram of a method according to a second embodiment of the present invention.

A second embodiment of the present invention is illustrated in FIG. 3 of the present application. This embodiment is based on the principle that the water column is non-attenuative for seismic waves, and that the free surface of the water column has a known, constant reflection coefficient $r_0$. As a result, all up-going energy in the water column should, at some later time, be recorded as down-going energy but with an amplitude reduced by a factor $r_0$. The only exception to this principle is the direct wave 6—the direct wave 6 produces down-going energy in the water column that does not have any corresponding up-going energy. A receiver-consistent, frequency-dependent calibration filter can be determined by finding the calibration filter that provides spectral balancing between the up-going energy and the down-going energy (after removing, or "muting", the direct wave from the down-going energy). Thus, the calibration filter is determined as the calibration filter that minimises the following objective function:

$$E = \sum_{f,k} W(f,k)(|V_z^-(f,k)| - |V_z^{(r)+}(f,k)|)^2, \quad (4)$$

In equation (4), W(f,k) is a weighting function that specifies the frequency-wave number window over which the minimisation process is performed, $V_z^-$ is the up-going constituent of the vertical particle velocity, and $V_z^{(r)+}$ is the down-going constituent of the vertical particle velocity after muting of the direct wave.

The terms $V_z^-(f,k)$ and $V_z^{(r)+}(f,k)$ in equation (4) may be expanded using equation (3) to give:

$$E = \sum_{f,k} W(f,k)(|V_z^-(f,k)| - |V_z^{(r)+}(f,k)|)^2 \quad (5)$$

$$= \sum_{f,k} W(f,k) \left( \begin{array}{c} \left| -\frac{q(f,k)}{2\rho} P(f,k) + \frac{a(f)}{2} v_z(f,k) \right| - \\ \left| \frac{q(f,k)}{2\rho} P^{(r)}(f,k) + \frac{a(f)}{2} v_z^{(r)}(f,k) \right| \end{array} \right)^2,$$

The superscript (r) again indicates that the direct wave has been removed.

Muting the direct wave is a known, straightforward process. In essence, a data mask is constructed that has a value of zero for the approximate arrival times of the direct wave and that is equal to one at all other times. The direct wave is then muted by multiplication of this mask with the data. The arrival time of the direct wave can be estimated from a rough estimate of the survey geometry, water depth and the velocity of seismic energy. The transition between zero and one in the data mask is preferably smooth rather than abrupt, and can be anywhere between the arrival time of the direct wave itself and the arrival time of the first water layer multiple since any primary reflections that may occur between these times are purely up-going waves. The direct wave is most easily muted in the (x-t) or (tau-p)-domains—in which case the pressure data and vertical velocity data are muted and then transformed to the f-k domain.

FIG. 3 is a flow chart showing one example of this method. Initially, multi-component seismic data are acquired at step 30 or are retrieved from storage at step 31. The multi-component seismic data contain at least pressure recordings and vertical particle velocity recordings.

At step 32, the pressure recordings are sorted into common shot gathers. At step 33 the pressure recordings are transformed to the f-k domain, and at step 34 the filter q(f,k) is obtained and the pressure data are filtered to determine the quantity q(f,k)P(f,k). Steps 30-34 correspond generally to steps 20-24 of the method of FIG. 2.

At step 35, the filtered pressure data are sorted into common receiver gathers.

One particular receiver gather is then selected at step 36. The pressure data P(x,t) and the vertical velocity data $v_z$(x,t) for that gather are then muted to remove the direct wave. The muted pressure data and vertical velocity data are then transformed to the f-k domain, at step 37, to give $P^{(r)}$(f,k) and $V_z^{(r)}$(f,k). The un-muted vertical velocity data are also transformed to the f-k domain in this step, to give $V_z$(f,k).

At step 38, a frequency-dependent calibration filter is determined for the selected receiver gather. This calibration filter is determined as the calibration filter that minimises the objective function B of equation (4) or equation (5).

The calibration filter obtained in step 38 may then be used to calibrate vertical velocity data acquired by the receiver (or receiver station) corresponding to the selected gather. This is indicated as step 39 in FIG. 3.

Steps 36-39 are then repeated for other receiver gathers, to determine calibration filters for each receiver.

The calibrated vertical velocity data may be subjected to further processing steps (not shown).

FIGS. 2 and 3 illustrate a calibration filter being obtained for one receiver gather (step 26, 38), and this calibration filter is applied to data for that receiver (step 27, 39) before calibration filters are determined for other receiver gathers. The invention need not be performed in this way, and it would be possible to determine calibration filters for each receiver gather before applying any of the calibration filters to data acquired by the respective receiver.

The invention has been described above with reference to calibrating the vertical velocity component $v_z$ against pressure, but the invention is not limited to this. It may alternatively be used to calibrate a horizontal component of the velocity against the pressure.

Figure 4:
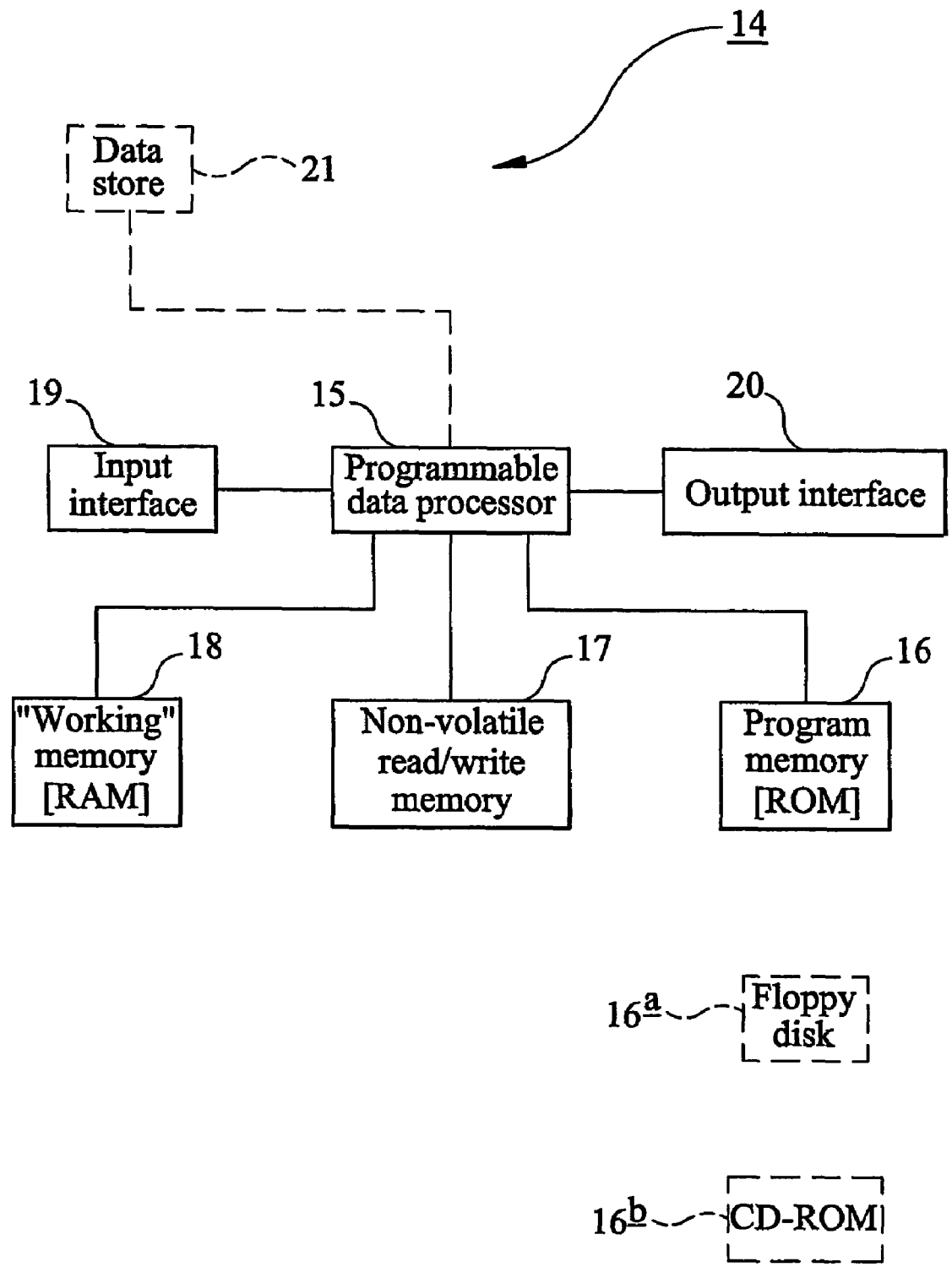
FIG. 4 is a schematic block diagram of an apparatus according to the present invention.

FIG. 4 is a schematic block diagram of a programmable apparatus 14 according to the present invention. The apparatus comprises a programmable data processor 15 with a programme memory 16, for instance in the form of a read-only memory (TOM), storing a programme for controlling the data processor 15 to perform any of the processing methods described above. The apparatus further comprises non-volatile read/write memory 17 for storing, for example, any data which must be retained in the absence of power supply. A "working" or scratch pad memory for the data processor is provided by a random access memory (RAM) 18. An input interface 19 is provided, for instance for receiving commands and data. An output interface 20 is provided, for instance for displaying information relating to the progress and result of the method. Seismic data for processing may be supplied via the input interface 19, or may alternatively be retrieved from a machine-readable data store 21.

The programme for operating the system and for performing the method described hereinbefore is stored in the programme memory 16, which may be embodied as a semi-conductor memory, for instance of the well-known ROM type. However, the programme may be stored in any other suitable storage medium, such as magnetic data carrier 16a, such as a "floppy disk" or CD-ROM 16b.

The invention claimed is:

1. A method of processing multi-component seismic data acquired at a receiver station from seismic signals propagating in a medium, the method comprising the steps of:
   selecting a first portion of the seismic data; and
   determining a calibration filter from the first portion of the seismic data, the calibration filter being to calibrate a first component of the seismic data relative to a second component of the seismic data;
   wherein the step of determining the calibration filter comprises processing the data in the common shot domain.

2. A method as claimed in claim 1 and comprising applying the calibration filter to the second component of the seismic data.

3. A method as claimed in claim 1 wherein the seismic data are obtained from seismic signals propagating in a water column.

4. A method as claimed in claim 1 wherein the second component of the seismic data is pressure.

5. A method as claimed in claim 4 and comprising determining q(f,k)P(f,k) in the common shot domain, where P denotes pressure, q denotes vertical slowness, f denotes frequency and k denotes horizontal wavenumber.

6. A method as claimed in claim 4 wherein the first component of the seismic data is a component of the particle motion.

7. A method as claimed in claim 6 wherein the first component of the seismic data is the vertical component of the particle motion.

8. A method as claimed in claim 3 wherein the step of determining the calibration filter further comprises determining a calibration filter that minimizes the energy immediately above the base of the water column of the down-going constituent of the first component of the seismic data for the selected portion of the seismic data.

9. A method as claimed in claim 8 and comprising determining a calibration filter that minimizes the energy immediately above the base of the water column of the down-going constituent of the vertical component of the particle velocity according to $$v_z^+(f,k) = \frac{1}{2}a(f)v_z(f,k) + \frac{q(f,k)}{2\rho}P(f,k)$$

where $v_z^+$ denotes the down-going constituent of the vertical component of the particle velocity, $v_z$ denotes the acquired vertical component of the particle velocity, a(f) denotes the calibration filter, and $\rho$ denotes the density of the water column.

10. A method as claimed in claim 3 wherein the step of determining the calibration filter further comprises determining a calibration filter that minimizes the difference, after muting the direct wave, between up-going energy in the water column and down-going energy in the water column.

11. A method as claimed in claim 10 and comprising determining a calibration filter that minimizes the following objective function:

$$E = \sum_{f,k} W(f,k)(|V_z^-(f,k)| - |V_z^{(r)+}(f,k)|)^2,$$

where W(f,k) is a weighting function, $V_z^-$ is the up-going constituent of the vertical particle velocity, and $V_z^{(r)+}$ is the down-going constituent of the vertical particle velocity after muting of the direct wave.

12. A method as claimed in claim 1 further comprising the steps of:
actuating a source of seismic energy to generate the seismic signals; and
acquiring the seismic data at the receiver station spatially separated from the source.

13. A method as claimed in claim 1 further comprising applying the calibration filter to a second portion of the seismic data acquired at the receiver station.

14. An apparatus for processing multi-component seismic data acquired at a receiver station from seismic signals propagating in a medium, the apparatus comprising:
means for determining a calibration filter from a first portion of the seismic data, the calibration filter being to calibrate a first component of the seismic data relative to a second component of the seismic data;
wherein the apparatus is adapted to determine the calibration filter by processing the seismic data in the common shot domain.

15. An apparatus as claimed in claim 14 and adapted to filter the second component of the seismic data in the common shot domain.

16. An apparatus as claimed in claim 15 and adapted to filter the acquired pressure seismic data in the common shot domain.

17. An apparatus as claimed in claim 16 and adapted to determine q(f,k)P(f,k) in the common shot domain, where P denotes pressure, q denotes vertical slowness, f denotes frequency and k denotes horizontal wavenumber.

18. An apparatus as claimed in claim 14 and comprising a programmable data processor.

19. A programmable apparatus, comprising:
a programmable data processor;
a program storage medium encoded with instructions that, when executed by the programmable data processor, perform a method of processing multi-component seismic data acquired at a receiver station from seismic signals propagating in a medium, the method including:
selecting a first portion of the seismic data; and
determining a calibration filter from the first portion of the seismic data, the calibration filter being to calibrate a first component of the seismic data relative to a second component of the seismic data;
wherein the step of determining the calibration filter comprises processing the data in the common shot domain.

20. A programmable apparatus as claimed in claim 19, wherein the encoded method further includes applying the calibration filter to the second component of the seismic data.

21. A programmable apparatus as claimed in claim 19 wherein the seismic data are obtained from seismic signals propagating in a water column.

22. A programmable apparatus as claimed in claim 19 wherein the second component of the seismic data is pressure.

23. A programmable apparatus as claimed in claim 19, wherein the encoded method further includes applying the calibration filter to a second portion of the seismic data acquired at the receiver station.

24. A programmable apparatus as claimed in claim 19 wherein the program storage medium is encoded with the seismic data.

25. A program storage medium encoded with instructions that, when executed by a programmable data processor, perform a method comprising:
selecting a first portion of the seismic data; and
determining a calibration filter from the first portion of the seismic data, the calibration filter being to calibrate a first component of the seismic data relative to a second component of the seismic data;
wherein the step of determining the calibration filter comprises processing the data in the common shot domain.

26. A program storage medium as claimed in claim 25, wherein the method further includes applying the calibration filter to the second component of the seismic data.

27. A program storage medium as claimed in claim 25 wherein the seismic data are obtained from seismic signals propagating in a water column.

28. A program storage medium as claimed in claim 25 wherein the second component of the seismic data is pressure.

29. A program storage medium as claimed in claim 25, wherein the method further includes applying the calibration filter to a second portion of the seismic data acquired at the receiver station.

30. A program storage medium as claimed in claim 25 wherein the program storage medium is encoded with the seismic data.

* * * * *